United States Patent Office 2,943,061
Patented June 28, 1960

2,943,061

DEMULSIFYING COMPOSITIONS AND PROCESS

Willard H. Kirkpatrick, Sugar Land, Tex., assignor to Visco Products Company, Houston, Tex., a corporation of Delaware No Drawing. Filed Mar. 19, 1956, Ser. No. 572,219

20 Claims. (Cl. 252—342)

This invention relates in particular to the treatment of emulsions of mineral oil and water, such as petroleum emulsions commonly encountered in the production, handling and refining of crude mineral oil, for the purpose of separating the oil from the water. Also, the invention relates to the treatment of other water-in-oil type of emulsions wherein the emulsions are produced artificially or naturally and the resolution of the emulsions presents a problem of recovery or disposal.

Petroleum emulsions are in general of the water-in-oil type wherein the oil acts as a continuous phase for the dispersal of finely divided particles of naturally occurring waters or brines. These emulsions are often extremely stable and will not resolve on long standing. It is to be understood that water-in-oil emulsions may occur artificially resulting from any one or more of numerous operations encountered in various industries. The emulsions obtained from producing wells and from the bottom of crude oil storage tanks are commonly referred to as "cut oil," "emulsified oil," "bottom settlings," and "B.S."

One type of process involves subjecting an emulsion of the water-in-oil type to the action of a demulsifying agent of the kind hereinafter described, thereby causing the emulsion to resolve and stratify into its component parts of oil and water or brine after the emulsion has been allowed to stand in a relatively quiescent state.

Another type of process involves the use of a demulsifying agent of the kind hereinafter described in refinery desalting operations. In the refining of many crude oils a desalting operation is necessary in order to prevent the accumulation of large deposits of salt in the stills and to prevent corrosion resulting from the decomposition of such salts under high still temperatures. In a typical desalting installation 5% to 10% of fresh water is added to the crude oil charge stock and emulsified therein by means of a pump or through a differential pressure valve. A demulsifying agent is added and the treated oil permitted to stand in a quiescent state for relatively short periods of time allowing the salt-laden water to stratify, whereupon it is bled off to waste resulting in 90% to 98% removal of salt content. This operation is carried out continuously as contrasted with batch treating.

One object of the present invention is to provide a novel and economical process for resolving emulsions of the character referred to into their component parts of oil and water or brine.

Another object is to provide a novel reagent which is water-wettable, interfacial and surface-active in order to enable its use as a demulsifier or for such uses where surface-active characteristics are necessary or desirable. Other objects will appear hereinafter.

The treating agents employed in accordance with the present invention consist of compositions of high molecular weight in which oxyalkylene groups from the class consisting of oxypropylene (e.g., oxy-1,2-propylene) and both oxyethylene and oxypropylene in a weight ratio of oxyethylene not exceeding 4:1 in the same molecule form the major proportion of the average molecular weight of the composition, and the composition contains at least one long oxyalkylene chain composed of said oxyalkylene groups, the molecular weight attributable to said oxyalkylene groups in said long oxyalkylene chain being at least 1000 where the oxyalkylene groups are both oxyethylene and oxypropylene and at least 1200, preferably at least 2000, where the oxyalkylene groups are solely oxypropylene groups. The said oxyalkylene groups preferably compose at least 60% of the molecular weight of any given composition and the best results have been obtained where the oxyalkylene groups consist of 80% to 100% by weight of oxypropylene groups. It has been discovered that the presence of these groupings conveys to the composition unexpected and unusual properties for resolving water-in-oil emulsions into their component parts. One possible theory which may be postulated for the striking effectiveness of these compositions in resolving petroleum emulsions is that they have a hydrophobe-hydrophile balance which heretofore has not been secured with compositions well known in this art.

Other factors may well be responsible for the unusual characteristics or extreme effectiveness of this type of composition. It is recognized that compositions having alternate or random oxyethylene and oxypropylene groupings within the same molecule possess properties entirely unexpected and unique. Such properties have been described in U.S. Patent 2,425,845. This patent describes the preparation of polyoxyalkylene diols prepared from the reaction of ethylene oxide, 1,2-propylene oxide and an aliphatic dihydroxy alcohol. The resulting heteric diols possess viscosity relationships, solubility relationships and fusion temperature relationships entirely unlike those expected, based on comparisons with polyoxyethylene glycols on the one hand and polyoxypropylene glycols on the other. For example, polyoxyethylene glycols of an average molecular weight of about 600 to 800 have the consistency of a semi-fluid, pasty mass. Below this range, the products are clear, normally liquid compositions which are miscible with water in all proportions. At and above the average molecular weight of 800 to 900 the polyoxyethylene glycols are low melting, normally solid compositions having a fusion temperature which increases with increased molecular weights from about 30° C. to a maximum of approximately 60° C. to 65° C. These solid products are miscible with water in all proportions. Polyoxypropylene compounds are known and available in molecular weights up to about 4,000. However, the addition products resulting from the reaction of 1,2-propylene oxide with water are referred to in the literature but the properties are not described in a manner which would permit identification of the product. Monoethers of polyoxypropylene glycols have been described in U.S. Patent 2,448,664 and these compounds, unlike similar polyoxyethylene compounds are immiscible with water and are miscible with paraffinic hydrocarbons, the extent of miscibility being determined by temperature and nature of the ether grouping. The monoethers of polyoxypropylene glycol have unusual temperature-viscosity relationships in that while they retain adequate body at elevated temperatures they do not become unusually viscous at low temperatures. It is significant that these products having molecular weights of 2,000 to 3,000 are liquids whereas the corresponding polyoxyethylene compounds are solids.

The compositions of this invention wherein oxyethylene and oxypropylene groupings are present in a random or alternate sequence possess characteristics which cannot be secured by a simple blending of polyoxyethylene compounds with polyoxypropylene compounds. It is possible within such a given molecule to secure a molecular weight from 3000 to 20,000 where the product remains liquid at normally prevailing temperatures. Such products are miscible in water and in oils. However, the water solubility decreases as the temperature is raised and at higher temperatures two-phase systems result. These characteristics are unusual and striking and would not be anticipated by careful consideration of the characteristics of polyoxyethylene glycols and polyoxypropylene glycols.

Among the compositions contemplated for use in accordance with this invention are those having the following structural formula:

$$R'(OC_nH_{2n})_xR$$

wherein R' is either hydrogen, an alkyl, alkenyl, aralkyl, aralkenyl, cycloalkyl, aryl, or acyl radical; R is either hydroxy, oxyalkyl, oxyaralkyl, oxycycloalkyl, oxyaryl, secondary or tertiary aminoalkyl, secondary or tertiary aminoaralkyl, secondary or tertiary aminoaryl, or oxyacyl; $n$ is 3 or both 2 and 3 in a single molecule and $x$ is equal to the number of times $n$ is 3 or is the sum of the number of times $n$ has a value of 2 plus the number of times that $n$ has a value of 3 and the maximum ratio of $n$ having a value of 2 to $n$ having a value of 3 is such that the weight ratio of oxyethylene to oxypropylene does not exceed 4 to 1, it being further understood that the molecular weight of said composition is in excess of 1000 when both the oxyethylene and the oxypropylene groups are present in the same molecule and in excess of 1200, preferably at least 2000, when the oxyalkylene groups consist solely of oxypropylene groups.

All of the compounds employed for the purpose of this invention are characterized by the nucleus $$-(OC_nH_{2n})_x-$$

wherein $n$ has a value of 3, or both 2 and 3 in a weight ratio not exceeding 4 to 1, and a major proportion, preferably at least 60% by weight of the compound, is attributable to this nucleus. The total molecular weight is preferably in the range of 1500 to 7500.

As typical examples of compositions which are included in this invention, there can be mentioned heteric polyoxyalkylene diols in which R' is represented by the hydrogen atom and R by the hydroxyl group; monoethers of heteric polyoxyalkylene diols in which R' is represented by an alkyl, alkenyl, aralkyl, aralkenyl, cycloalkyl, or aryl radical and R is represented by the hydroxyl group; diethers of heteric polyoxyalkylene diols in which R' is represented by an alkyl, aralkyl, cycloalkyl or aryl radical and R by oxyalkyl, oxyaralkyl, oxycycloalkyl or oxyaryl radical; monoesters of heteric polyoxyalkylene diols in which R' is represented by an acyl radical and R by the hydroxyl group; diesters of heteric polyoxyalkylene diols in which R' is represented by an acyl radical and R by an oxyacyl radical; amine compositions in which R' is represented by hydrogen and R by secondary or tertiary aminoalkyl, secondary or tertiary aminoaralkyl, secondary or tertiary aminocycloalkyl, secondary or teritary aminoaryl and chain substituted carboxy acids derived from hydroxy carboxy acids. It is to be understood that the substitution of hydrogen by halogen, nitro, hydroxyl, sulfonic and the like in the above radical does not depart from the scope of this invention for simple substitution products of this nature have been found to be equally satisfactory for the purposes as outlined herein.

It is not intended that the foregoing lists each and every heteric polyoxyalkylene oxide composition that will satisfactorily resolve water-in-oil emulsions in accordance with this invention, for it will be obvious to those skilled in the art that certain mixed derivatives of the heteric polyoxyalkylene diols would function satisfactorily and in fact are contemplated by the present invention. As examples of these mixed derivatives of heteric polyoxyalkylene diols, one may mention the monoester-monoether, the monoester-monoamine, etc.

In order that these heteric polyalkylene oxide compositions possess the properties of efficiently breaking petroleum emulsions, they should be of relatively high molecular weight. Generally stated, it may be said that these compositions employed for the purposes of this invention may be characterized as having a total average molecular weight of at least 1000 and the hetero polyoxyalkylene groups constitute a major proportion of this molecular weight.

These demulsifying compounds employed for the purposes of the invention may be also be described as being surface active and water wettable, and those which do not possess a nitrogen atom, a sulfonic group, and/or a carboxyl group within the molecule may be described as being nonionic in that they do not ionize to yield organic cations or organic anions.

The compounds employed in accordance with this invention may be prepared in several ways. For example, U.S. Patent 2,425,845 describes the method of preparing hetero polyoxyalkylene diols. Briefly, good results may be obtained by placing a mixture containing the ethylene oxide and the propylene oxide into intimate contact with a dihydroxy aliphatic alcohol, in a liquid phase throughout which a suitable catalyst is uniformly dispersed. For best results, it is essential that the addition reaction be carried out under conditions which are controlled with respect to such factors as the amount of active catalyst employed and the uniformity of its dispersion, the amount of unreacted alkylene oxides present at all stages during the reaction, the temperature maintained throughout the course of the reaction and particularly the intimacy and uniformity of contact of the reactants during the process. As a catalyst, sodium hydroxide or potassium hydroxide is preferred in amount which is about 0.2 to 1% by weight of the reactants. Excessive concentrations of unreacted alkylene oxides are to be avoided and pressures of 5 to 50 pounds per square inch are preferred for reaction conditions.

Compositions suitable for the practice of the invention can also be prepared by adding the alkylene oxides successively, rather than concurrently, to an inital starting material containing a reactive hydrogen atom, as, for example, a monohydric alcohol, a polyhydric alcohol or a primary or secondary amine. Thus, 1,2-propylene oxide can be added to such a starting material followed by ethylene oxide. Similarly, ethylene oxide can be added directly to a long chain preformed polyoxypropylene glycol to product compositions suitable for the practice of the invention. For example, 1,2-propylene oxide can be polymerized to produce a long chain polyoxypropylene glycol containing 35 mols of 1,2-propylene oxide and 4 to 12 mols of ethylene oxide are added to produce a polyoxyethylated polyoxypropylene diol. This composition can be used as such in the practice of the invention or employed as an intermediate in making ethers, esters and amine addition products in the manner herein described which are also suitable for the practice of the invention. All of these compositions are characterized by the fact that they contain at least one long oxyalkylene chain composed of oxypropylene groups or both oxyethylene and oxypropylene groups in which the molecular weight attributable to such oxyalkylene groups is at least 1200 when the oxyalkylene groups are all oxypropylene groups and at least 1000 when the oxyalkylene groups are both oxyethylene and oxypropylene groups, with the further proviso in the latter case that the weight ratio of oxyethylene to oxypropylene cannot exceed 4:1. The presence of too many oxyethylene groups detracts from the effectiveness of the composition in breaking water-in-oil petroleum emulsions.

The preparation of monoethers of hetero polyoxyalkylene diols has been described in U.S. Patent 2,425,755.

Briefly, these products are prepared by placing the ethylene oxide and propylene oxide mixture into intimate contact with the monohydroxy alcohol in a liquid phase throughout which a suitable catalyst is uniformly dispersed. As a catalyst, sodium hydroxide or potassium hydroxide is preferred in an amount which is about 0.2% to 1% by weight of the total amount of reactants. All of the catalyst need not be added at the start of the reaction. The reaction can be successfully carried out at temperatures of 80° C. to 160° C. which is sufficiently high to favor rapid reaction of the alkylene oxides. Pressures comparable for the manufacture of the diols have been found to be satisfactory for production of the monoethers. Excessive concentrations of unreacted alkylene oxide are also avoided. In order to discourage the formation of undesired side reaction products, the vessel is preferably swept out with gaseous nitrogen to remove oxygen which is conducive to undesired side reactions.

The above reaction may be represented by the following equation where the mixture of ethylene oxide and propylene oxide is used.

$$ROH + y(CH_2CH_2O) + z(CH_3C_2H_3O) \rightarrow R(OC_nH_{2n})_xOH$$

In the foregoing equation, ROH is an aliphatic monohydroxy alcohol; $y$ and $z$ represent the mols of ethylene oxide and 1,2-propylene oxide respectively; $n$ is both 2 and 3 is a single molecule, the total number of times $n$ has a value of 2 being equal to $y$ and the total number of times $n$ has a value of 3 being equal to $z$; and $x$ is the total number of such oxyalkylene groups, being equal to $y$ plus $z$. Methods of effecting this reaction with the mixed oxides and the resultant compositions have been described in U.S. Patent 2,425,755. Certain modifications of this general reaction may be employed to produce compositions of the practice of the present invention, e.g., in place of the aliphatic monohydroxy alcohol (ROH), the alkylene or mixed oxides may be reacted with a polyoxyalkylene monohydroxy alcohol prepared by this or some other route, to result in a product of the same chemical nature but of increased molecular weight because of the increased length of the polyoxyalkylene chain.

Another way in which the same class of products may be prepared is to effect the reaction of an alkyl, aryl, cycloalkyl, or aralkyl halide with an alkali metal alcoholate. Much work on this general preparative scheme has been done by Hibbert and his coworkers (see e.g., Journal American Chemical Society, vol. 61, p. 1905). The two equations given below illustrate the reaction involved.

$$RX + Na(OC_2H_4)_xOH \rightarrow R(OC_2H_4)_xOH + NaX$$
$$RX + Na(OC_3H_6)_xOH \rightarrow R(OC_3H_6)_xOH + NaX$$

In these equations, R represents alkyl, aralkyl, aryl or cycloalkyl, $x$ is a whole number, and X is halogen, e.g., chlorine or bromine. For convenience, polyoxyethylene glycols and polyoxypropylene glycols have been used for illustration, but it will be understood that polyoxyalkylene glycols containing both oxyethylene and oxypropylene groups in the same molecule will undergo the same type of reaction.

The symmetrical diethers of the hetero polyoxyalkylene diols may be prepared by reaction of two molecular proportions of the desired alkyl, aryl, aralkyl or cycloalkyl halide with one molecular proportion of the disodium salt of the hetero polyoxyalkylene diol according to the following equation:

$$2RX + Na(OC_nH_{2n})_xONa \rightarrow R(OC_nH_{2n})_xOR + 2NaX$$

where R is alkyl, aryl, aralkyl or cycloalkyl, X is halogen, $n$ is both 2 and 3 and $x$ is some whole number.

By starting with the dihalide derivative of the hetero polyoxyalkylene diol and reacting one molecular proportion thereof with two molecular proportions of a sodium alcoholate, the same type of products will result.

One may start with the monoether of a hetero polyoxyalkylene diol prepared in accordance with the procedure outlined above and react it with sodium to give the corresponding alcoholate. This alcoholate may then be reacted in accordance with equation (1) below with any desired alkyl halide to yield diethers of the hetero polyoxyalkylene diol or in accordance with equation (2) with an alkylene dihalide to give a diether of a hetero polyoxyalkylene diol. These reactions are illustrated in the following two equations:

(1)
$$R(OC_nH_{2n})_xOH + Na \longrightarrow R(OC_nH_{2n})_xONa \xrightarrow{RX} R(OC_nH_{2n})_xOR + NaX$$

where R is alkyl, X is halogen, $n$ is both 2 and 3 and $x$ is a whole number such that the molecular weight is at least 1000.

(2) $$2R(OC_nH_{2n})_xONa + X(C_nH_{2n})X \rightarrow [R(OC_nH_{2n})_xO]_2C_nH_{2n} + 2NaX$$

where R, $n$, and X have the same significance as in the previous equation.

Although the above procedures have been discussed under the heading of the preparation of symmetrical diethers, it is to be understood that by proper choice of the reaction procedure unsymmetrical diethers can be prepared which are suitable for the purpose of this invention. The preferred compositions employed for the practice of this invention are esters of an organic carboxy acid and an organic non-acidic hydroxy compound having a hydroxyl group attached to an acyclic carbon atom and esterified with said carboxy acid and further characterized by having oxyalkylene groups from the class consisting of oxypropylene and both oxyethylene and oxypropylene in a weight ratio of oxyethylene to oxypropylene not exceeding 4:1 in the same molecule form the major proportion of the average molecular weight of said ester, said ester being predominantly monomeric exclusive of said oxyalkylene groups and containing a long uninterrupted oxyalkylene chain composed of said oxyalkylene groups in which the molecular weight attributable to said oxyalkylene groups in said long chain is at least 1000 when the oxyalkylene groups are both oxyethylene and oxypropylene and at least 1200 where the oxyalkylene groups are solely oxypropylene groups.

The monoesters and diesters of hetero polyoxyalkylene diols are prepared in accordance with recognized and established procedures for such synthesis. The most simple manner of preparing the monoesters or diesters is by reacting the diol with the required acid anhydride. In many instances the reaction will proceed without the application of external heat. For the purposes of this invention, the presence of a small quantity of residual free acid is not harmful to the resulting demulsifying characteristics of the ester compounds. In those instances where acid anhydrides are not readily available, or if it is desired that the resulting product contain no free acid, the diol may be reacted with the required acid in the presence of a solvent which lends itself to azeotropic distillation. The reaction mass is then heated at elevated temperatures until the theoretical amount of water has been secured to indicate substantial esterification. Both symmetrical and unsymmetrical diesters can be prepared with these procedures and the resulting compositions are effective in demulsifying water-in-oil emulsions. Further, it has been noted that both mono- and diesters of polybasic acids, when one or more of the carboxyl groups remain unreacted, are particularly effective as demulsifiers. It has been found that both organic acids, as well as inorganic acids, such as boric, phosphoric, arsenic and the like, are suitable esterifying acids for purposes of this invention.

The reaction conditions employed in the preparation of esters for the purpose of the invention are esterifying conditions which will vary somewhat depending upon the reactants but normally involve the reaction of an esterifying acid with a compound having a hydroxyl group connected to an acyclic carbon atom at temperatures within the range of 50° C. to 300° C. for a period of time from 2 to 12 hours. If the starting materials contain more than one hydroxyl group and/or more than one acid group, the resultant compositions are cogeneric mixtures of esters but under these reacting conditions, in view of the fact that the hydroxy-containing compound must also contain at least one long oxyalkylene chain having a molecular weight of at least 1000 as herein described, the mixtures are predominantly monomeric esters. In other words, the predominating components of the mixtures are esters which contain a single ester linkage connecting the residue of the acid with a long oxyalkylene chain of the type described or a single long oxyalkylene chain connected at opposite ends to ester linkages or another type of chemical structure wherein the ester groups and the long oxyalkylene chains do not recur in the same molecule. Especially good results in the practice of the invention have been obtained by the use of predominantly monomeric dicarboxy acid esters of aliphatic hydroxy compounds having a terminal hydroxyl group connected to a long polyoxyalkylene chain in which the oxyalkylene groups are composed of oxypropylene groups or both oxyethylene groups and oxypropylene groups with a weight ratio of oxyethylene to oxypropylene not exceeding 4:1 and the average molecular weight attributable to said oxyalkylene groups in said chain is at least 1200 where the oxyalkylene groups are solely oxypropylene groups and at least 1000 where the oxyalkylene groups are both oxyethylene and oxypropylene groups. The preferred dicarboxy acids for the purpose of preparing the foregoing esters are those containing 2 to 8 carbon atoms and especially maleic anhydride, diglycolic acid and phthalic anhydride.

In the general formula $R'(OC_nH_{2n})_xR$ when $n$ is 3, $R'$ is hydrogen and R is the residue of diglycolic acid, the product will have the formula

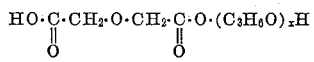

where $x$ equals the number of oxypropylene groups present in a polyoxypropylene glycol having a molecular weight of at least 1200. As will be apparent from the foregoing description this product is obtained by reacting one mol of diglycolic acid with one mol of a polyoxypropylene glycol having a molecular weight of at least 1200.

In the same general formula if $n$ is 3 and $R'$ and R are both residues of diglycolic acid, the product will have the general formula

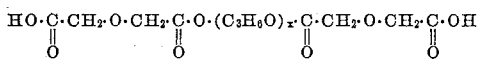

where $x$ equals the number of oxypropylene groups present in a polyoxypropylene glycol having a molecular weight of at least 1200. This product is obtained by reacting two mols of diglycolic acid with one mol of a polyoxypropylene glycol having a molecular weight of at least 1200.

If maleic anhydride is used instead of the diglycolic acid, the formulae of the respective products are

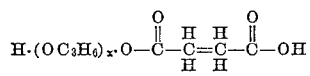

where $x$ equals the number of oxypropylene groups present in a polyoxypropylene glycol having a molecular weight of at least 1200, and

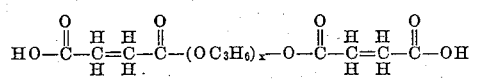

where $x$ equals the number of oxypropylene groups present in a polyoxypropylene glycol having a molecular weight of at least 1200.

If in the general formula $R'(OC_nH_{2n})_xR$ $n$ is both 2 and 3, the product where two mols of maleic anhydride are reacted with one mol of a high molecular weight polyoxyalkylene glycol has the general formula

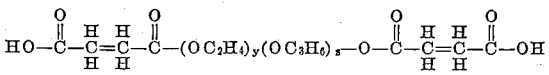

where $y$ and $z$ represent the number of oxyethylene and oxypropylene groups, respectively.

If diglycolic acid is used instead of the maleic anhydride, the product has the formula

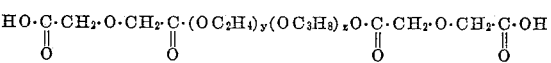

where $y$ and $z$ represent the number of oxyethylene and oxypropylene groups, respectively.

The secondary amino and tertiary amino derivatives having hetero polyoxyalkylene groupings are prepared by intimately mixing, for example, ethylene oxide, propylene oxide and either a primary or secondary amine, respectively, in a reaction vessel. An alkaline catalyst, such as sodium hydroxide or potassium hydroxide, is to be preferred and should be uniformly dispersed throughout the reaction mixture. Conditions similar to those previously described in the preparation of polyoxyalkylene diols and monoethers of hetero polyoxyalkylene diols should be maintained for optimum results.

A substituted chain carboxy acid composition having hetero polyoxyalkylene groups is prepared under similar conditions by using, for example, the methyl ester of glycolic acid, where the glycolate, ethylene oxide and propylene oxide are intimately mixed and a catalyst is chosen such that it is not sufficiently alkaline to saponify the starting ester. Optimum conditions are similar to those outlined for the preparation of diols and monoethers.

A still further type of composition having hetero polyoxyalkylene groupings that has been found to be an effective demulsifier can be prepared by reacting a polyoxyethylene glycol and a polyoxypropylene glycol with formaldehyde in the presence of an acid catalyst. The resulting compositions are broadly classed as polyformal derivatives. By varying the types of glycols and the relative quantities of the glycols used as starting materials one can secure compounds having hydrophobe-hydrophile balances which extend from one extreme to the opposite extreme.

Since, as indicated above, it is possible to prepare the compositions of this invention by various routes, and from a number of different classes of starting materials, the invention should not be limited by the following examples, which are merely intended to illustrate some satisfactory procedures for preparing a few of the materials suitable for employment within the scope of the present invention.

EXAMPLE I

Step I.—A polyoxyalkylene glycol starting material of relatively low molecular weight was made by introducing a mixture of 18 parts of ethylene oxide and 6 parts of 1,2-propylene oxide into a suitable reactor charged with 20 parts of diethylene glycol and 1.56 parts of dry powdered sodium hydroxide intimately dispersed therein. The reaction mixture was vigorously agitated and maintained at a temperature of about 119° C. to 127° C. throughout the reaction. About 18 minutes were required to feed in the oxides which were supplied at a rate to maintain a pressure of 16 p.s.i. After all of the oxides had been charged the reaction mixture was recycled for a period of 30 minutes.

Step II.—A mixture of 60 parts of ethylene oxide and 20 parts of 1,2-propylene oxide was introduced into a reactor containing 20 parts of the product of Step I at a rate to maintain a pressure of about 22 to 30 p.s.i. over a period of about 1 hour. No additional sodium hydroxide was added and a temperature of about 111° C. to 122° C. was maintained during the reaction and the reaction mixture recycled for about ½ hour after all of the oxides had been introduced. The product was a liquid and was neutralized with dilute sulfuric acid and filtered to yield a diol composition having a molecular weight of about 1,060.

EXAMPLE II

*Step I.*—Ninety-five (95) parts by weight of a mixture of equal amounts of ethylene oxide and propylene oxide were introduced into 20 parts of butyl alcohol containing 1 part of powdered sodium hydroxide dispersed therein. The temperature was raised to about 115° C. and the oxide mixture was introduced into the butyl alcohol at such a rate that the pressure was maintained at about 26 p.s.i. over a period of about 3 hours.

*Step II.*—To 40 parts by weight of the reaction product of Step I was added 0.5 part by weight of powdered sodium hydroxide followed by 70 parts by weight of a mixture of equal parts of ethylene oxide and propylene oxide. The temperature was maintained at 113° C. during the reaction, and the oxide mixture supplied at such a rate as to maintain a pressure of about 22 p.s.i. The reaction time was about 2 hours. The reaction product of this step was neutralized with dilute sulfuric acid and filtered to yield the monoether polyoxyalkylene diol compound.

EXAMPLE III

A solution of sodium isopropoxide was prepared from sodium and substantially anhydrous isopropanol. To 205 parts of sodium isopropoxide was added 340 parts of the monobutyl ether of a polyoxyalkylene glycol, the polyoxyalkylene chain of which contained ethylene oxide and propylene oxide in a 1:1 ratio, and the total molecular weight (for the butyl ether) of which was approximately 1700. The reaction was refluxed for one hour and the isopropanol was removed under reduced pressure until the theoretical amount had been secured. The resulting sodium salt of the monoether diol was cooled and 13.7 parts of butyl bromide was added drop-wise with stirring over a period of about 30 minutes. The reaction mass was allowed to continue with stirring to 110° C. until a test for alkalinity to phenolphthalein was negative, which required about 1 hour. The reaction mixture was then diluted with isopropanol to facilitate the subsequent filtration in order to remove the precipitated sodium chloride. The isopropanol was then removed by heating to 100° C. under reduced pressure to yield the diether of a heteric polyoxyalkylene diol.

EXAMPLE IV

To 1,060 parts of diol as prepared in Example I contained in a suitable reaction flask there was added 300 parts of oleic acid and 100 parts of a hydrocarbon diluent such as $SO_2$ extract. The reaction mixture was heated to 160° C. to 220° C. until an amount of water had distilled over equivalent to the theoretical amount required for esterification. If it is desired that the monoester be isolated in substantially pure form, the hydrocarbon vehicle may be removed by heating at elevated temperatures under vacuum.

The diester may be prepared in a similar manner by using 600 parts of oleic acid instead of the 300 parts required for the preparation of the monoester.

EXAMPLE V

In a suitable reaction flask there was placed 500 parts of a monoether of a heteric polyoxyalkylene diol having a molecular weight of 5000 as prepared similar to the directions of Example II, 15 parts of maleic anhydride and 100 parts of $SO_2$ extract. At approximately 50° C., the maleic anhydride melted and apparently added to the terminal —OH by opening of the anhydride linkage. To insure complete reaction, the reaction mixture was heated for 4 hours at 200° C. This yielded the monoether-monoester composition having a residual free carboxyl group.

EXAMPLE VI

*Step I.*—Ninety-five (95) parts by weight of the mixture of equal amounts of ethylene oxide and propylene oxide were introduced into 20 parts by weight of butylamine containing 1 part of powdered sodium hydroxide dispersed therein. The temperature was maintained at about 105° C. and the oxide mixture was introduced into the butylamine at such a rate that the pressure was maintained at about 20 p.s.i over a period of about 3 hours.

*Step II.*—To 30 parts by weight of the reaction product of Step I was added 0.5 part by weight of powdered sodium hydroxide, followed by 70 parts by weight of a mixture of equal parts of ethylene oxide and 1,2-propylene oxide. The temperature was maintained at 105° C. during the reaction and the oxide mixture supplied at such a rate as to maintain a pressure of about 18 p.s.i. The reaction product of this step was a heteric polyoxyalkylene amine composition having a molecular weight of approximately 1000.

EXAMPLE VII

*Step I.*—Ninety-five (95) parts by weight of a mixture of equal amounts of ethylene oxide and propylene oxide were introduced into 22 parts by weight of methyl glycolate containing 1 part of boron trifluoride dispersed therein. The temperature was maintained at about 115° C. and the oxide mixture was introduced into the methyl glycolate at such a rate that the pressure was maintained at about 26 p.s.i. over a period of about 3 hours.

*Step II.*—To 40 parts by weight of the reaction product of Step I was added 0.5 part by weight of boron trifluoride, followed by 70 parts by weight of a mixture of equal parts of ethylene oxide and 1,2-propylene oxide. The temperature was maintained at about 115° C. during the reaction, and the oxide mixture supplied at such a rate as to maintain a pressure of about 22 p.s.i. The reaction time was about 2 hours. The reaction product was a chain substituted carboxy acid ester wherein the chain is composed of heteric polyoxyalkylene groupings.

EXAMPLE VIII

In a suitable reaction flask 60 parts of a polyoxyethylene glycol having a molecular weight of 400, 152 parts of a polyoxypropylene glycol having a molecular weight of 2000, 7 parts of trioxymethylene, 1 part ferric chloride and 150 parts of benzene were heated. During the course of this reaction 4.6 parts of water were azeotropically distilled from the reaction mass and discarded. The resulting polyformal derivative may be used as such or can be isolated by filtering and removing the benzene under reduced pressure.

EXAMPLE IX

To 220 parts of a hetero polyoxyalkylene diol having a molecular weight of 2200 (wherein the oxypropylene groups constitute 25% by weight and the oxyethylene groups 75% by weight of the oxyalkylene groups present) contained in a suitable reaction flask there is added 30 parts of phthalic anhydride and 100 parts of a hydrocarbon diluent such as $SO_2$ extract. The reaction mixture is heated to 155° C. and held at that temperature for a period of 5 hours. Esterification is accomplished by the opening of the anhydride linkage to completely esterify both hydroxy groups of the starting diol. After cooling to approximately 100° C., 400 parts of a hydrocarbon diluent such as $SO_2$ extract is added to yield the finished product.

EXAMPLE X

To 400 parts of a polyoxypropylene glycol having a molecular weight of 2000 contained in a suitable reaction flask there is added 75 parts of phthalic anhydride. The reactancts are heated with agitation for a period of 12 hours at a temperature of 230° C. to 240° C. Somewhat elevated temperatures are required to secure esterification by opening of the anhydride linkage on account of the fact that at least a portion of the hydroxy groups present in the diol are secondary and not as reactive as primary hydroxy groups. In order to secure the finished product, 900 parts of a suitable hydrocarbon extract is added and agitated to secure uniform solution of the ester.

EXAMPLE XI

To 850 parts of a monobutyl ether of a hetero polyoxyalkylene diol having a molecular weight of 1700 contained in a suitable reaction flask there is added 15.5 parts of substantially anhydrous boric acid and 200 parts of a hydrocarbon diluent such as $SO_2$ extract. The reaction mixture is heated to 170° C. to 208° C. for 3 hours or until such time as an amount of water has distilled equivalent to the theoretical amount required for esterification. The resulting product will have one acidic replaceable hydrogen which has not been reacted with an alcoholic hydroxyl group. The product as above prepared may be used as a surface active material, as well as an emulsion breaking reagent.

EXAMPLE XII

To 300 parts of polyoxypropylene glycol having a molecular weight of 2000 contained in a suitable reaction flask there is added 3.6 parts of phosphorous pentoxide. The reaction mixture is heated with stirring for 8 hours at 185° C. to 195° C. The resulting product is a phosphoric acid ester of a polyoxypropylene glycol and may be dissolved in suitable solvents for ease of subsequent handling.

EXAMPLE XIII

In a suitable reaction flask there is placed 1000 parts of polyoxypropylene glycol having a molecular weight of 2000, 74 parts of phthalic anhydride and 200 parts of a suitable hydrocarbon fraction such as $SO_2$ extract. The phthalic anhydride reacts at approximately 150° C. by opening of the anhydride linkage to form the monophthalate of the polyoxypropylene glycol.

EXAMPLE XIV

The butyl ether of polyoxypropylene glycol having a molecular weight of 1200 is prepared by the reaction of butyl bromide with the alkali metal alcoholate of the polyoxypropylene glycol.

To 653 parts of the monobutyl ether of a polyoxypropylene glycol, prepared as above, contained in a suitable reaction flask, there is added 150 parts of tallol (which is essentially an equal mixture of unsaturated acids and resin acids) and 300 parts of $SO_2$ extract. The reaction mixture is heated until an amount of aqueous distillate has been secured which is equivalent to the theoretical amount of water required for complete esterification. This requires a reaction time of approximately 4 hours and temperatures between 170° C. and 220° C. The finished product is the tallol ester of the butyl ether of the polyoxypropylene glycol.

EXAMPLE XV

A heteric polyoxyalkylene diol having a molecular weight of approximately 1500 is prepared in accordance with the procedure described in U.S. Patent 2,425,845.

To 750 parts of the diol as prepared above there is added 150 parts of oleic acid and 100 parts of a hydrocarbon diluent such as $SO_2$ extract. The reaction mixture is heated at 160° C. to 220° C. until an amount of water has distilled over equivalent to the theoretical amount required for esterification. The reaction material is the mono-oleic ester of the heteric diol.

EXAMPLE XVI

In a suitable reaction flask there is placed 500 parts of a monobutyl ether of a heteric polyoxyalkylene diol having a molecular weight of 5000, as prepared in accordance with the procedure described in U.S. Patent 2,425,755, 15 parts of maleic anhydride and 100 parts of $SO_2$ extract. At approximately 150° C. the maleic anhydride dissolves and forms the monoester by adding to the terminal hydroxyl group by opening of the anhydride linkage. To insure complete reaction the reaction mixture is heated for 4 hours at 200° C. This yields the monoether-monoester composition having a free residual carboxyl group.

EXAMPLE XVII

In a suitable reaction flask there is placed 850 parts of a butyl ether of a heteric polyoxyalkylene diol having a molecular weight of approximately 1700 as prepared similarly to the directions of Example XIV, 34 parts of diglycolic acid and 100 parts of $SO_2$ extract. The reaction mixture is heated and an aqueous distillate begins to form at 208° C. After 5 hours heating and a maximum temperature of 257° C., a total of 9 parts of aqueous distillate is secured to yield the didiglycolic ester of the monobutyl heteric diol ether.

By way of illustrating the remarkable effectiveness of the products contemplated by this invention, the method of testing their efficiency in bottle tests will be described and exemplary data given, and this will be followed by the results of a full scale plant test.

Field bottle test I

Field bottle tests were made on samples of emulsified oil taken from the Ten Sections Field in California. A sample grind out showed that these emulsions contained about 23 parts of water per 100 parts of emulsion. The oil being treated in this field had a gravity of about 33° A.P.I. A gun barrel system was being used in the field and the oil was being treated at an approximate temperature of 110° F. One hundred (100) cc. samples were taken and placed in conventional field test bottles. A test with another chemical which was being used to treat the oil indicated that about 0.07 cc. of a 10% solution of the treating chemical was required per 100 cc of sample. In testing the composition of the present invention, the treatment employed was at the rate of one gallon of the treating chemical to 258 barrels of net oil, that is, oil after the removal of the water. The overall treating ratio was one gallon of treating chemical to 345 barrels of emulsified oil.

After the test chemical was added, the samples which were placed in the test bottles were shaken 200 times at atmospheric temperature and subsequently agitated an additional 100 times at treating temperature of 110° F. After shaking in each instance the water drop was determined and recorded, that is to say, the amount of water which separated from the emulsion. The color of the oil was also observed and recorded at the same time. After agitating at elevated temperature the samples were maintained at 110° F. to permit settling and stratification of the water.

The samples were secured just after the oil came from the well and every effort was made to maintain conditions comparable to those present in a full scale plant treatment. After agitation, the samples were allowed to settle and were tested for water drop at predetermined periods of time and recorded on suitable test sheets.

The test showed that when a monoether of a hetero polyoxyalkylene diol having a molecular weight of approximately 3000 was employed as the treating agent, 12 out of the 23 parts of water dropped out of the emulsion in 100 minutes and 20 parts were resolved after 180 minutes. When the monobutylether of a heteric polyoxyalkylene diol having a molecular weight of about 5000 was employed as the treating agent 20 out of the 23 parts of water dropped out of the emulsion in 100 minutes and 21 out of the 23 parts of water dropped out in 180 minutes. The color of the oil in each instance was excellent. The samples were permitted to stand in a quiescent state for 2 hours and 10 minutes after the hot agitation and the oil was then subjected to what is known as a "thief grind out" test, which showed that all of the emulsion had been resolved. The results of these tests, therefore, were very satisfactory.

*Field bottle test II*

Using the test procedure similar to that described in Field Bottle Test I, an emulsion from a well in the Hastings, Texas, Field was tested. The temperature was 140° F. The quantity of treating chemical employed was one gallon to 260 barrels. The treatment using monobutylethers of heteric polyoxyalkylene diols having average approximate molecular weights of 1700, 300 and 5000 dropped out substantially all of the water before hot agitation. The color of the oil was good. In this case, the total amount of water present in the emulsified oil was 22 parts per 100 parts of emulsified oil.

*Field bottle test III*

Using the procedure similar to that described in above tests, an emulsion was taken from a well in the Thompsons, Texas, Field and tested. The temperature of the test was the prevailing air temperature. This field did not have the gun barrel type of treating system. The emulsion contained 64 parts of water per 100 parts of emulsion. The rate of treatment was 1 gallon of chemical to every 55 barrels of net oil. Tests were made with monobutylethers of heteric polyoxyalkylene diols having average molecular weights of 1700, 3000 and 5000. All gave excellent color to the resolved oil which indicates good emulsion breaking properties. They gave a very loose web at the water-oil interface. In this case the agitation was 200 shakes. With all of the aforementioned treating agents about ⅚ or most of the water had separated after agitation and settling for 60 minutes. After remaining in a quiescent state for an additional 30 minutes, the water had completely separated and the oil was substantially dry.

*Field bottle test IV*

The manner of testing was similar to that described in Field Bottle Test I, using an emulsion secured from the Cayuga, Texas, Field. The temperature of the test was 160° F. and the quantity of treating chemical employed was 1 gallon of chemical to 250 barrels of net oil. There was a total of 70 parts of emulsified water present per 100 parts of emulsified oil. Using a monoester-monoether derivative of a heteric polyoxyalkylene diol, 69 of the 70 parts of water had separated before the bottles were given hot agitation. After settling 30 minutes at 160° F. substantially all of the water had separated which indicated that the emulsion had been resolved satisfactorily.

*Field bottle test V*

Using a similar testing procedure and the same emulsion described in Field Bottle Test II, a series of monoethers and diethers of polyoxyethylene glycols, polyoxypropylene glycols and heteric polyoxyalkylene diols were tested. The tests were conducted using ratios of the treating chemical equivalent to 1 gallon of chemical to approximately 250 barrels of net oil. This particular sample of emulsion contained 18% emulsified water therein.

The monobutylether of heteric polyoxyalkylene diols having a molecular weight of 1700 and 5000 showed remarkable demulsifying properties in that substantially all of the emulsified water separated and the color of the treated oil was a brilliant green, indicating substantially complete resolution of the emulsion.

Several compositions having mixed terminal ether linkages were tested in which one butyl ether group remained constant and the other ether linkage consisted of, respectively, octyl, lauryl, cetyl, benzyl, and cyclohexyl. The treatment with all of these chemicals dropped out substantially all of the water after standing in a quiescent state for 25 minutes at 140° F. The efficiency and speed of resolution for this particular emulsion increased as the molecular weight of the ether group increased.

*Plant scale test I*

This test was made by actually treating the oil coming from the well in a producing field in Arkansas. A National heater treater was being used with a chemical proportioning pump to add the chemical treating reagent.

The treating agent employed was a 40% by weight solution of a monobutylether of a heteric polyoxyalkylene diol having a molecular weight of 1700 in which the oxyalkylene portion of the molecule consisted of oxyethylene and oxypropylene groups in the approximate molar ratio of 1:1. The treatment was started about 5:40 p.m. and was observed until midnight. At 6:00 a.m. the next day the amount of treatment was reduced. Over a 3-hour interval, it was observed that the chemical consumption indicated about 3 to 4 gallons per 24 hours. Since the oil was being treated perfectly, it was decided to reduce the consumption and the chemical proportioning pump was set at about 9 strokes per minute (BS & B chemical pump). An hour and a half later the test indicated that the oil contained 0.2% free water which was not settling in the treater. After another hour and a half grind out tests were made which indicated that the treatment was leveling off with a consumption of about 2 to 2½ gallons of the treating agent per day as against 4 gallons of another treating agent previously employed in this plant system. A check on the following day indicated that 2 gallons and 3 pints of the treating agent had been used during the previous 24 hours. The treating ratio was 1 gallon of chemical per 600 barrels of oil or a ratio of 1:25,000 in parts by weight. The treatment was continued and found to be very effective.

*Plant scale test II*

This test was made by actually treating the oil from the production from a well in the Cayuga, Texas, Field. The treating system consisted of the separator, gun barrel and a chemical proportioning pump to add the chemical treating agent.

The treating agent employed was a monoester-monoether of a heteric polyoxyalkylene diol corresponding to that prepared in Example V above. The treatment was started at 2:30 and was observed for 72 hours. During the first 24 hours the rate of chemical injection was adjusted so that the chemical consumption was about 2 gallons per day, which compared favorably with another treating agent which had previously been used in this plant system. During the 3 day test the oil was treated satisfactorily with the oil going to stock at from 0.4 to 1.0% BS & W which is substantially below the pipeline specifications for the given field. The treating ratio was 1 gallon of chemical per 160 barrels of oil. The treatment was continued and found to be entirely satisfactory.

In the previous description frequent reference has been made to heteric polyoxyalkylene diols and by the word "heteric" is meant that the diol constituents of the mixture vary in internal configuration from molecule to molecule, such variations arise out of a randomness of the distribution of the oxyethylene and the oxypropylene groups therein, such as results, for instance, from the concurrent reaction of the ethylene oxide and the propylene oxide on the starting material and the intermediate products.

Throughout the specification and claims, the following definitions apply:

Alkyl—a monovalent radical derived from an aliphatic hydrocarbon by removal of one hydrogen atom, as, for example, methyl, ethyl, propyl, octyl, cetyl, myricyl and their homologues, preferably containing 1 to 30 carbon atoms;

Alkenyl—a monovalent radical derived from an unsaturated aliphatic hydrocarbon, as, for example, ethenyl (vinyl), allyl, undecenyl, octadecenyl, linolenyl, and their homologues, containing 2 to 18 carbon atoms and preferably having a single double bond;

Aralkyl—a monovalent radical derived from an aromatic substituted aliphatic hydrocarbon, as, for example, benzyl, phenylethyl, phenylpropyl, phenylbutyl, phenyloctyl, phenylcetyl, phenyloctadecyl and homologues, preferably containing 1 to 30 carbon atoms in the alkyl chain;

Cycloalkyl—a monovalent radical derived from a cycloaliphatic hydrocarbon, as, for example, cyclopentyl, cyclohexyl and cycloheptyl;

Aralkenyl—a monovalent radical derived from an aromatic substituted unsaturated aliphatic hydrocarbon, as, for example, styryl, cinnamyl, and homologues;

Aryl—a monovalent radical derived from an aromatic hydrocarbon by removal of one hydrogen atom, as, for example, phenyl and naphthyl;

Acyl—a monovalent radical derived from an organic acid by the removal of the hydroxy group, as, for example, formyl, acetyl, propionyl, butyryl, octoyl, lauryoyl, stearoyl, trichloroacetyl, oleyl, ricinoleyl, benzoyl, phenylacetyl, naphthoyl, mono- and diphthaloyl, mono- and dimaleoyl, mono- and dimalonyl, mono- and di-adipoyl, mono- and diglutamoyl, mono- and disuccinoyl, toluene sulfonyl, naphthalene sulfonyl and acyl radicals derived from petroleum sulfonic acids;

Oxyalkyl—a monovalent radical derived from an aliphatic alcohol by removal of the hydrogen atom of an alcoholic hydroxyl, as, for example, methoxy, ethoxy, and homologues thereof;

Oxyaralkyl—a monovalent radical derived from an aralkyl alcohol by removal of the hydrogen atom of an alcoholic hydroxyl, as, for example, —O—CH$_2$C$_6$H$_5$, —O—C$_2$H$_4$C$_6$H$_5$, and homologues thereof;

Oxyaryl—a monovalent radical derived from a phenol by removal of the hydrogen of the phenolic hydroxy, as, for example, phenoxy, naphthoxy, and homologues thereof;

Oxycycloalkyl—a monovalent radical derived from a cycloaliphatic alcohol by removal of the hydrogen of the alcoholic hydroxy, as, for example, cyclopentyloxy, cyclohexyloxy, cycloheptyloxy, and homologues;

Oxyacyl—a monovalent radical having the structure

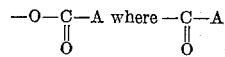

represents an acyl group, as, for example, the formic acid ester, acetic acid ester, ricinoleic acid ester, diglycolic acid esters, phthalic acid esters, tallol esters, succinic acid esters, abietic acid ester, trimethylhexanoic acid ester, esters formed from alcoholysis products of castor oil, and homologues thereof;

Secondary aminoalkyl—a monovalent radical derived by the removal of hydrogen from a nitrogen atom of a primary alkyl amine, as, for example, methylamino, ethylamino, butylamino, and higher homologues;

Tertiary aminoalkyl—a monovalent radical derived by the removal of hydrogen from a nitrogen atom of a secondary alkyl amine, as, for example, dimethylamino, diethylamino, diisopropyl amino, dibutylamino and higher homologues;

Halogen—one of the atoms chlorine, bromine, iodine or fluorine;

Halide—a salt containing a halogen atom at the anion.

The following specific compositions may be mentioned as illustrative of compositions which are suitable for the practice of the invention:

I. Compositions like those described in Example I prepared with different proportions of ethylene oxide and 1,2-propylene oxide, in which the molal ratio of ethylene oxide to 1,2-propylene oxide is 2:3, 1:3, and 1:9.

II. Ether alcohols similar to those in Example II where methyl, butyl, tetradecyl, octadecyl and myricyl groups have been substituted for the butyl group. In connection with these compositions it should be noted that while the methyl derivative works satisfactorily, the butyl derivative is better and the tetradecyl derivative is still better for breaking water-in-oil emulsions in the tests which have been made with these compositions.

III. Various specific diether derivatives of the heteric polyoxyalkylene diols have been previously described herein.

IV. A specific illustration of another composition related to that described in Example IV is the ester obtained by reacting phthalic anhydride with the polyoxyalkylene diol known as Ucon 75 H 1400.

V. Compositions prepared like that described in Example V but substituting the chemical equivalent amounts of oleic, acetic, ricinoleic, diglycolic, phthalic, tallol, succinic, or abietic acids. Other specific examples of related products are the products obtained by reacting Ucon 50 HB 660 or Ucon 50 HB 5100 in an alcoholysis reaction with castor oil where the Ucon products are used in place of glycerine. Another type of product may be prepared by following the directions of Example V but by employing blown tallol in chemically equivalent proportions to the maleic anhydride. Another type of product is obtained under similar conditions to those described in Example V by reacting Ucon 50 HB 5100 with trimethylhexanoic acid.

The demulsifying compositions are preferably employed in the proportion of 1 part of reagent to from 2000 to 50,000 parts of emulsion either by adding the concentrated product direct to the emulsion or after diluting with a suitable vehicle in the customary manner.

The suitable hydrocarbon vehicle referred to in the examples is sulfur dioxide (SO$_2$) extract. This material is a by-product from the Edeleanu process of refining petroleum in which the undesirable fractions are removed by extraction with liquid sulfur dioxide. After removal of the sulfur dioxide a mixture of hydrocarbons, substantially aromatic in character, remains which is designated in the trade as SO$_2$ extract. Examples of other suitable hydrocarbon vehicles are Gray Tower polymers, toluene, xylene, gas oil, diesel fuel, Bunker fuel and coal tar solvents. The above cited examples of solvents are adaptable to azeotropic distillation as would also be any other solvent which is immiscible with water, miscible with the reacting mass and has a boiling point or boiling range in excess of the boiling point of water.

The products prepared in accordance with the invention are very useful in breaking petroleum emulsions, especially those in which the oil is paraffinic or paraffinic-naphthenic, and has been successfully used in breaking water-in-oil petroleum emulsions in the mid-continent oil fields, including Oklahoma, Illinois, Kansas, the Gulf Coast, Louisiana, Southwest Texas and California.

This application is a continuation-in-part of my copending application Serial No. 99,333, filed June 15, 1949 (now abandoned), which is a continuation-in-part of Serial No. 98,162, filed June 9, 1949 (now abandoned), which in turn is a continuation-in-part of Serial No. 58,354, filed November 4, 1948, now matured into U.S. Patent 2,615,853.

Certain of the subject matter herein disclosed relating to the use of inorganic esters is claimed in my U.S. Patent 2,654,714. Certain of the subject matter herein disclosed relating to the use of certain diethers of polyoxyalkylene aliphatic diols is claimed in my U.S. Patent 2,622,859. Certain of the subject matter herein disclosed relating to the use of certain aliphatic diols is claimed in my U.S. Patent 2,754,271. Certain of the subject matter herein disclosed relating to the use of compositions of high molecular weight having a long oxyalkylene chain connected to an amino group of a water soluble monoamine is claimed in my copending application Serial No. 571,882, filed March 16, 1956, now U.S. Patent No. 2,875,157. The use of certain addition products of compounds from the group consisting of aldehydes and ketones and aliphatic hydroxy compounds containing a primary hydroxyl group is claimed in my copending application Serial No. 567,728, filed February 27, 1956, now U.S. Patent No. 2,900,350.

The invention is hereby claimed as follows:

1. A process of resolving water-in-oil emulsions into their components which comprises treating such emulsions with an ester of an organic carboxy acid and an organic non-acidic hydroxy compound having a hydroxyl group attached to an acyclic carbon atom and esterified with said carboxy acid and further characterized by having oxyalkylene groups from the class consisting of oxypropylene and both oxyethylene and oxypropylene in a weight ratio of oxyethylene to oxypropylene not exceeding 4:1 in the same molecule form the major proportion of the average molecular weight of said ester, said ester being monomeric exclusive of said oxyalkylene groups and containing only one long uninterrupted oxyalkylene chain composed of said oxyalkylene groups in which the molecular weight attributable to said oxyalkylene groups in said long chain is at least 1000 when the oxyalkylene groups are both oxyethylene and oxypropylene and at least 1200 where the oxyalkylene groups are solely oxypropylene groups.

2. A process as claimed in claim 1 in which said carboxy acid is a hydrophilic dicarboxy acid.

3. A process as claimed in claim 1 in which said carboxy acid is maleic anhydride.

4. A process as claimed in claim 1 in which said carboxy acid is diglycolic acid.

5. A process as claimed in claim 1 in which said carboxy acid is phthalic anhydride.

6. A process as claimed in claim 1 in which said organic non-acidic hydroxy compound is a polyoxyalkylene diol which is an oxyethylated polyoxypropylene glycol containing about 35 mols of 1,2-propylene oxide and 4 to 12 mols of ethylene oxide.

7. A process as claimed in claim 1 in which said organic non-acidic hydroxy compound contains both oxyethylene and oxypropylene groups.

8. A process as claimed in claim 1 in which the oxyalkylene groups in said organic non-acidic hydroxy compound are solely oxypropylene groups.

9. A process as claimed in claim 1 in which the oxyalkylene groups in said organic non-acidic hydroxy compound are solely oxypropylene groups and the molecular weight attributable thereto is approximately 2000.

10. A process of resolving water-in-oil emulsions into their components which comprises treating such emulsions with an ester of a dicarboxy acid containing 2 to 8 carbon atoms and a polyoxyalkylene compound having a primary hydroxyl group esterified with said acid in which oxyalkylene groups are from the class consisting of oxypropylene and both oxyethylene and oxypropylene in a weight ratio of oxyethylene to oxypropylene not exceeding 4:1 in the same molecule and form the major proportion of the average molecular weight of the ester, the ester is monomeric exclusive of said oxyalkylene groups and the molecular weight attributable to said oxyalklene groups in a single long chain is at least 1000 when the oxyalkylene groups are both oxyethylene and oxypropylene and at least 1200 where the oxyalkylene groups are solely oxypropylene groups, said ester being further characterized by the fact that it contains only one long oxyalkylene chain.

11. A process as claimed in claim 10 in which said polyoxyalkylene compound is a polyoxyalkylene diol.

12. A process as claimed in claim 10 is which said polyoxyalkylene compound is an ether alcohol containing a single terminal ether group and a single terminal hydroxyl group.

13. A process of resolving water-in-oil emulsions into their components which comprises treating such emulsions with a compound having the following formula $$R'(OC_nH_{2n})_xR$$

where R' is acyl, R is oxyacyl, n is 2 to 3 but cannot be only 2, the maximum ratio of n having a value of 2 to n having a value of 3 is such that the weight ratio of oxyethylene to oxypropylene does not exceed 4:1, and the value of x is such that the average molecular weight attributable to the radical —(OC$_n$H$_{2n}$)— is at least 1000 when n is both 2 and 3 and at least 1200 when n is only 3, with the further proviso that the radical —(OC$_n$H$_{2n}$)— constitutes at least 60% by weight of the total molecular weight and the total molecular weight is within the range of 1500 to 7500.

14. A process of resolving water-in-oil emulsions into their components which comprises treating such emulsions with a compound having the following formula $$R'(OC_nH_{2n})_xR$$

where R' is alkyl, R is oxyacyl, n is 2 to 3 but cannot be only 2, the maximum ratio of n having a value of 2 to n having a value of 3 is such that the weight ratio of oxyethylene to oxypropylene does not exceed 4:1, and the value of x is such that the average molecular weight attributable to the radical —(OC$_n$H$_{2n}$)— is at least 1000 when n is both 2 and 3 and at least 1200 when n is only 3, with the further proviso that the radical —(OC$_n$H$_{2n}$)— constitutes at least 60% by weight of the total molecular weight and the total molecular weight is within the range of 1500 to 7500.

15. A process of breaking water-in-oil emulsions which comprises treating such emulsions with a higher fatty acid ester of a polyoxyalkylene diol in which the major proportion of the average molecular weight is attributable to mixed oxyethylene and oxypropylene groups having a weight ratio of oxyethylene to oxypropylene not exceeding 4:1 and the average molecular weight of said polyoxyalkylene diol is at least 1000.

16. A process of resolving water-in-oil emulsions into their components which comprises treating such emulsions with an ester of a fatty acid and an organic non-acidic hydroxy compound having a hydroxyl group attached to an acyclic carbon atom and esterified with said fatty acid and further characterized by having oxyalkylene groups from the class consisting of oxypropylene and both oxyethylene and oxypropylene in a weight ratio of oxyethylene to oxypropylene not exceeding 4:1 in the same molecule form the major proportion of the average molecular weight of said ester, said ester being monomeric exclusive of said oxyalkylene groups and containing a long uninterrupted oxyalkylene chain composed of said oxyalkylene groups in which the molecular weight attributable to said oxyalkylene groups in said long chain is at least 1000 when the oxyalkylene groups are both oxyethylene and oxypropylene and at least 1200 where the oxyalkylene groups are solely oxypropylene groups.

17. A process of resolving water-in-oil emulsions into their components which comprises treating such emulsions with a compound having the following formula $$R'(OC_nH_{2n})_xR$$

where n is 3, R' is hydrogen, R is an oxyacyl radical derived from diglycolic acid, and x equals the number of oxypropylene groups present in a polyoxypropylene glycol having a molecular weight of at least 1200.

18. A process of resolving water-in-oil emulsions into their components which comprises treating such emulsions with a compound having the following formula $$R'(OC_nH_{2n})_xR$$

where $n$ is 3, $R'$ is an acyl radical of diglycolic acid, $R$ is an oxyacyl radical of diglycolic acid, and $x$ equals the number of oxypropylene groups present in a polyoxypropylene glycol having a molecular weight of at least 1200.

19. A process of breaking water-in-oil emulsions which comprises treating such emulsions with a compound having the formula $$R'(OC_nH_{2n})_xR$$

where $n$ is 3, $R'$ is hydrogen, $R$ is an oxyacyl group of maleic anhydride, and $x$ equals the number of oxypropylene groups present is in polyoxypropylene glycol having a molecular weight of at least 1200.

20. A process of breaking water-in-oil emulsions which comprises treating such emulsions with a compound having the formula $$R'(OC_nH_{2n})_xR$$

where $n$ is 3, $R'$ is an acyl group of maleic anhydride, $R$ is an oxyacyl group of maleic anhydride, and $x$ equals the number of oxypropylene groups present in a polyoxypropylene glycol having a molecular weight of at least 1200.

References Cited in the file of this patent

UNITED STATES PATENTS

| | | |
|---|---|---|
| 2,527,970 | Sokol | Oct. 31, 1950 |
| 2,562,878 | Blair | Aug. 7, 1951 |
| 2,615,853 | Kirkpatrick et al. | Oct. 28, 1952 |
| 2,662,859 | Kirkpatrick | Dec. 15, 1953 |
| 2,754,271 | Kirkpatrick | July 10, 1956 |

UNITED STATES PATENT OFFICE

CERTIFICATE OF CORRECTION

Patent No. 2,943,061

June 28, 1960

Willard H. Kirkpatrick

It is hereby certified that error appears in the printed specification of the above numbered patent requiring correction and that the said Letters Patent should read as corrected below.

Column 13, line 22, for "300" read -- 3000 --; column 15, line 74, for "at" read -- as --; column 16, line 74, for U. S. Patent "2,622,859" read -- 2,662,859 --.

Signed and sealed this 6th day of December 1960.

(SEAL)
Attest:

KARL H. AXLINE
Attesting Officer

ROBERT C. WATSON
Commissioner of Patents